United States Patent [19]

Takahashi et al.

[11] 4,411,175
[45] Oct. 25, 1983

[54] METHOD FOR MAKING A RING-SHAPED MOLD

[75] Inventors: Kenichi Takahashi; Koichi Hirano, both of Kodaira; Shoji Futamura, Kawasaki, all of Japan

[73] Assignees: Bridgestone Tire Co., Ltd., Tokyo; Institute of Technology Precision Electrical Discharge Works, Kawasaki, both of Japan

[21] Appl. No.: 193,977

[22] Filed: Oct. 6, 1980

[30] Foreign Application Priority Data

Oct. 18, 1979 [JP]  Japan ................ 54/134512

[51] Int. Cl.³ .................. B21K 5/20; B23P 17/00
[52] U.S. Cl. .................... 76/107 R; 29/416
[58] Field of Search ............. 29/416; 72/468, 478; 76/107 R, 107 A; 83/54, 651.1; 425/11, 17, 20–25, 28 D; 219/69 M, 69 W

[56] References Cited

U.S. PATENT DOCUMENTS

| 404,522 | 6/1889 | Ecaubert | 76/107 R |
| 514,648 | 2/1894 | Ecaubert | 76/107 R |
| 2,794,351 | 6/1957 | Hawkinson | 76/107 R |
| 3,186,063 | 6/1965 | Dopp | 29/416 X |
| 3,293,950 | 12/1966 | Kern et al. | 76/107 R |
| 3,999,907 | 12/1976 | Pappas | 425/28 D |
| 4,353,785 | 10/1982 | Inoue | 83/651.1 X |

FOREIGN PATENT DOCUMENTS

| 533120 | 11/1956 | Canada | 76/107 R |
| 618236 | 8/1978 | U.S.S.R. | 219/69 W |

*Primary Examiner*—Ervin M. Combs
*Attorney, Agent, or Firm*—McGlew and Tuttle

[57] ABSTRACT

A ring-shaped mold of the split mold type constructed by assembling into an annular shape a plurality of sectorial separate blocks formed by cutting a ring-shaped workpiece haveing a mold surface on the annular circumference thereof, and the method and apparatus for making the same are disclosed. Sector lines interfacing adjoining the separate blocks on the mold surface intersect the circumference of the ring-shaped mold at angles not perpendicular to said circumference.

19 Claims, 18 Drawing Figures

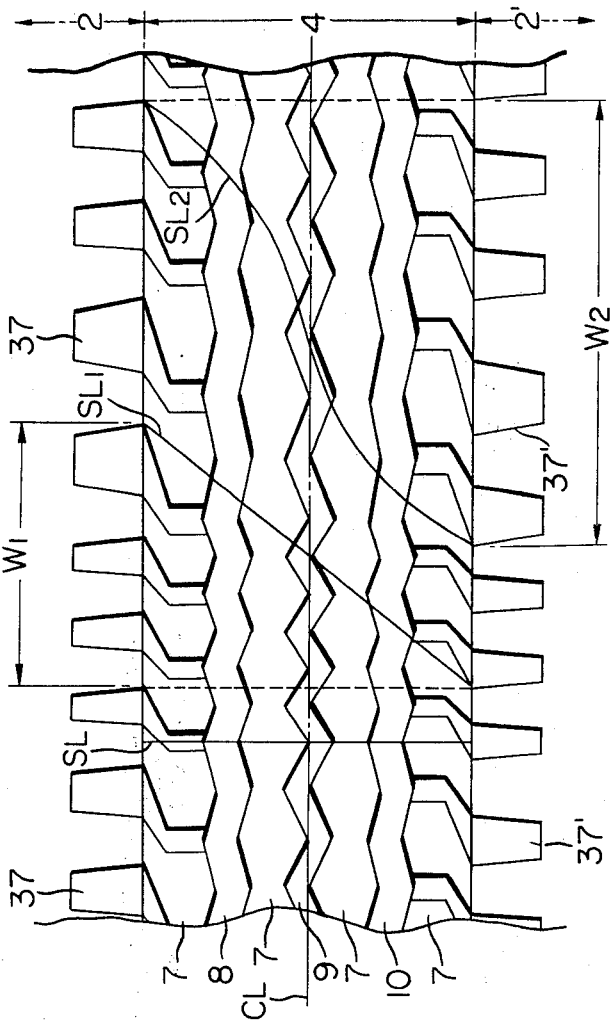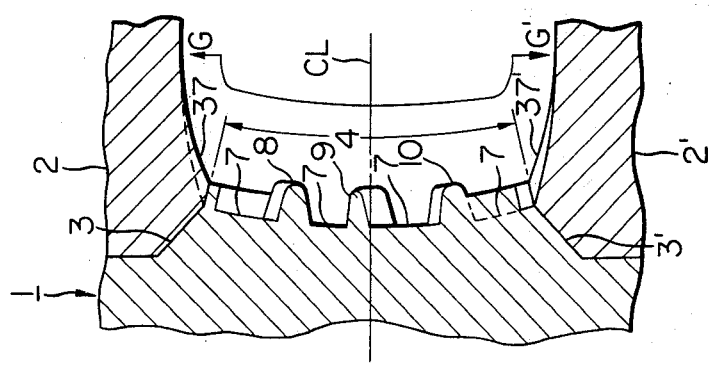

METHOD FOR MAKING A RING-SHAPED MOLD

BACKGROUND OF THE INVENTION

1. Field of the Invention

This invention relates generally to a ring-shaped mold and the method and the apparatus for making the same, and more particularly to a ring-shaped mold of the split mold type constructed by assembling into an annular shape a plurality of sectorial separate blocks formed by centripetally cutting a ring-shaped workpiece by means of a cutting device using a wire cutting tool and the method and the apparatus for making the same, wherein a set for a ring-shaped mold can be manufactured from a single ring-shaped workpiece due to small cutting allowances resulting from the use of the wire cutting tool.

SUMMARY OF THE INVENTION

It is an object of this invention to provide a ring-shaped mold and the method and the apparatus for making the same wherein manufacturing costs can be reduced because a set for a ring-shaped mold is manufactured by assembling in an annular shape a plurality of separate blocks formed by cutting a single ring-shaped workpiece by means of a cutting device using a wire cutting tool.

It is another object of this invention to provide a ring-shaped mold constructed of a plurality of separated blocks which can be easily formed by centripetally cutting a ring-shaped workpiece by means of a cutting device using a wire cutting tool which travels at all times in the direction normal to the center axis of the ring-shaped workpiece, and the method and the apparatus for making the same.

It is another object of this invention to provide a ring-shaped mold and the method and the apparatus for making the same wherein the sector lines of the ring-shaped mold constructed of annularly assembled separate blocks can be provided in any direction because the separate blocks are formed by cutting a ring-shaped workpiece by means of the wire cutting tool which travels at all times in the direction normal to the center axis of the ring-shaped workpiece while causing the ring-shaped workpiece and/or the wire cutting tool to rotate around the center axis of the workpiece and to move with each other in the center axis direction.

It is a further object of this invention to provide a ring-shaped mold for molding tires and the method and the apparatus for making the same wherein the sector lines of the ring-shaped mold for molding tires are provided in such a manner as to obliquely intersect the annular circumference of the ring-shaped mold with a view to reducing vibration in an automobile equipped with tires molded with the ring-shaped mold during travelling on the road.

It is a further object of this invention to provide a ring-shaped mold for molding tires and the method and the apparatus for making the same wherein the sector lines of the ring-shaped mold for molding tires are provided in such a manner as to intersect at right angles blades or projections provided on the tread surface of the mold, or in a mold having discontinuous blades or projections, not to interfere with the discontinuous blades or projections to prevent deformation of the ends of the blades or projections and extend the life of the mold.

It is a further object of this invention to provide a ring-shaped mold and the method and the apparatus for making the same wherein a wire electrode type electro-discharge machining device is used as a cutting device for cutting the ring-shaped workpiece to obtain a ring-shaped mold with excellent roundness by reducing the cutting allowances required for cutting the ring-shaped workpiece.

Other object and advantages of this invention will become apparent from the following description and claims taken in connection with the accompanying drawings.

BRIEF DESCRIPTION OF THE DRAWINGS

FIGS. 10A through 12B are diagrams of assistance in explaining other manufacturing methods of a ring-shaped mold according to this invention.

DESCRIPTION OF THE PRIOR ART

Figure 1:
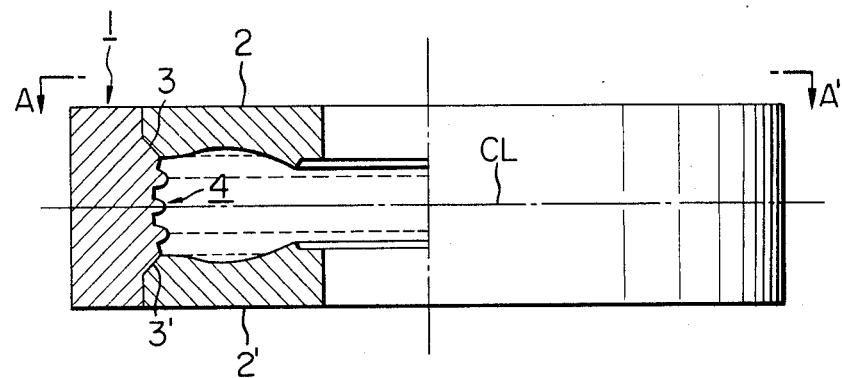
FIG. 1 is a side cross-section illustrating an example of a mold for molding tires.
Figure 2:
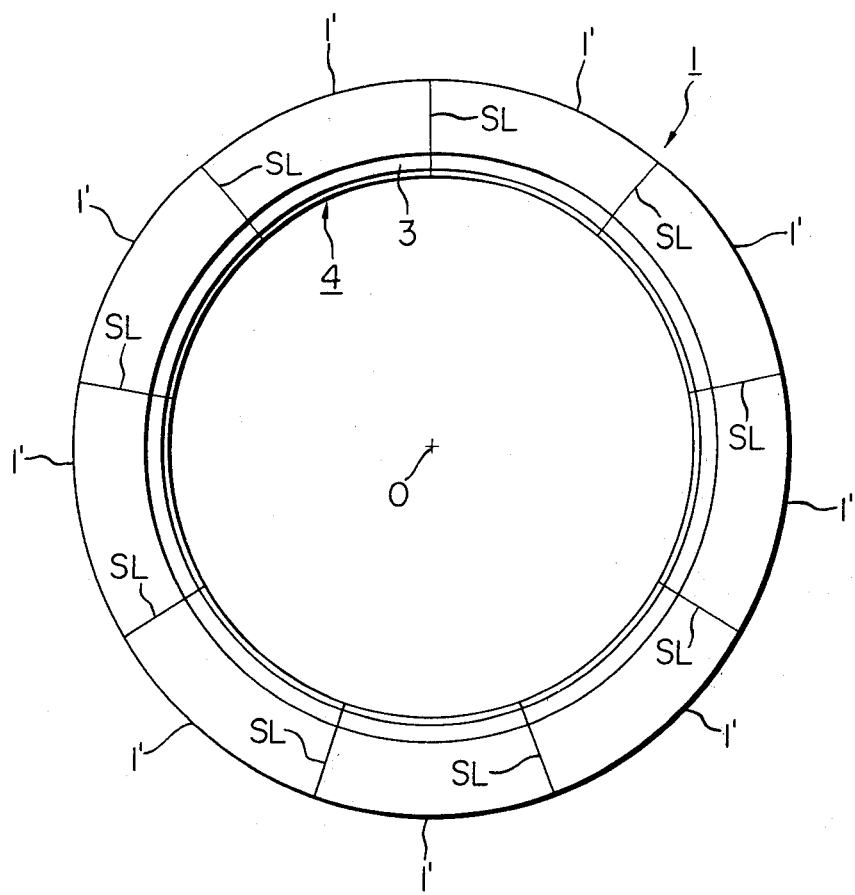
FIG. 2 is a plan view of the tread portion of the mold viewed from the direction of arrows A—A' shown in FIG. 1.
Figure 3A:
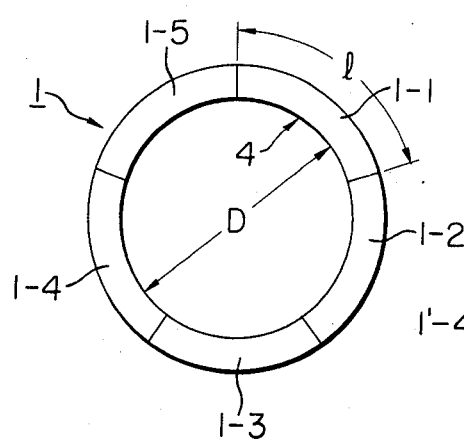
FIGS. 3A through 3C are diagrams of assistance in explaining an example of the conventional manufacturing method of a split mold type ring-shaped mold.
Figure 3B:
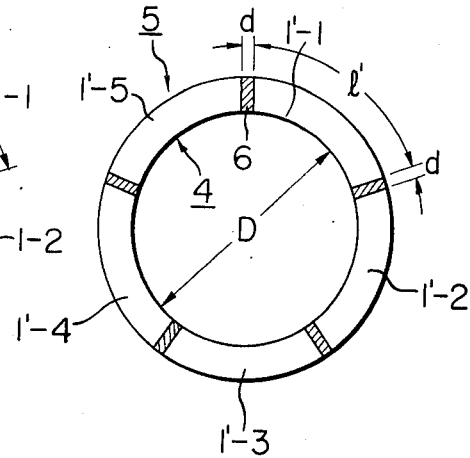
Figure 3C:
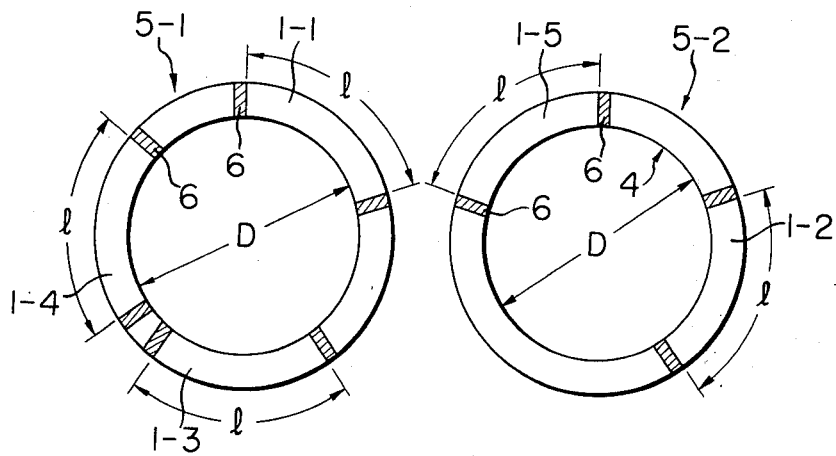

In general, ring-shaped molds, for example, molds for molding tires, are usually of the so-called split mold type in which a plurality of arcuately formed separate blocks are assembled into an annular shape. That is, a tire molding mold comprises a tread portion 1 on the inner circumference of which a profile corresponding to the tread pattern of the tire being molded is provided, and shoulder portions 2 and 2', as shown in FIG. 1 (a side crosssection of a tire molding mold). Reference numerals 3 and 3' in FIG. 1 refer to faying surfaces of the tread portion 1 and the shoulder portions 2 and 2', 4 to a tread surface on which a profile corresponding to the tread pattern of the tire being molded is formed by machining the inner circumference of the tread portion 1. Symbol CL refers to the center line of the tread surface 4 in the circumferential direction. The tread portion 1 is constructed by assembling a plurality of arcuately formed separate blocks 1' into an annular shape, as shown in FIG. 2 (a plan view of the tread portion 1 viewed from the direction of arrows A—A' shown in FIG. 1). In FIG. 2, symbol O refers to the annular center of the tread portion 1; SL to sector lines of the tread portion 1. The separate blocks 1' are manufactured by centripetally cutting a tread ring having formed on the inner circumference thereof a profile corresponding to the tread pattern of the tire being molded. The conventional manufacturing method of the separate blocks 1' will be described in the following, referring to FIG. 3. FIG. 3A is a plan view of the tread portion 1 of the tire molding mold. The tread portion 1 shown in FIG. 3A comprises five pieces of separate blocks 1-1 through 1-5. In the figure, numeral 4 refers to a tread surface; symbol D to the annular inside diameter of the tread portion 1; l to the circular arc length of each of the separate blocks 1-1 through 1-5. Five pieces of the separate blocks 1-1 through 1-5 as shown in FIG. 3A are obtained by cutting, a tread ring 5 as shown in FIG. 3B having a tread surface 4 of the same dimensions and shape as that of the tread portion 1 shown in FIG. 3A. The shaded portions of the figure represent incisions 6 caused by the cutting operation. Assuming that the cutting allowances for the incisions 6 are d, the circular arc length l' of separate blocks 1'-1 through 1'-5 obtained by the cutting equals to (l-d). Consequently, the separate blocks 1'-1 through 1'-5 thus obtained, when assembled in an annular shape, do not form a desired tread portion as shown in FIG. 3A because the resulting tread portion does not form a true circle and the diameter thereof is smaller than desired. A band saw or other cutting machines have heretofore been used for cutting the tread ring 5. With such a cutting machine, however, it is impossible to obtain a set of the tread portion 1 from a single tread ring 5 because of relatively large cutting allowances d. To overcome this problem, there is no other means but to prepare two pieces of tread rings 5-1 and 5-2, as shown in FIG. 3C, from which the separate blocks 1-1 through 1-5 having the exact circular arc length l are cut. With the conventional manufacturing method of the tread portion, as shown in FIG. 3C, therefore, two tread rings are required to obtain a set of separate blocks. This requires higher manufacturing costs as well as high precision in determining cutting positions during cutting.

DETAILED DESCRIPTION OF THE INVENTION

Now, a ring-shaped mold of the split mold type according to this invention will be described, referring to FIGS. 4 through 7 and relating to tire molding molds.

Figure 4:
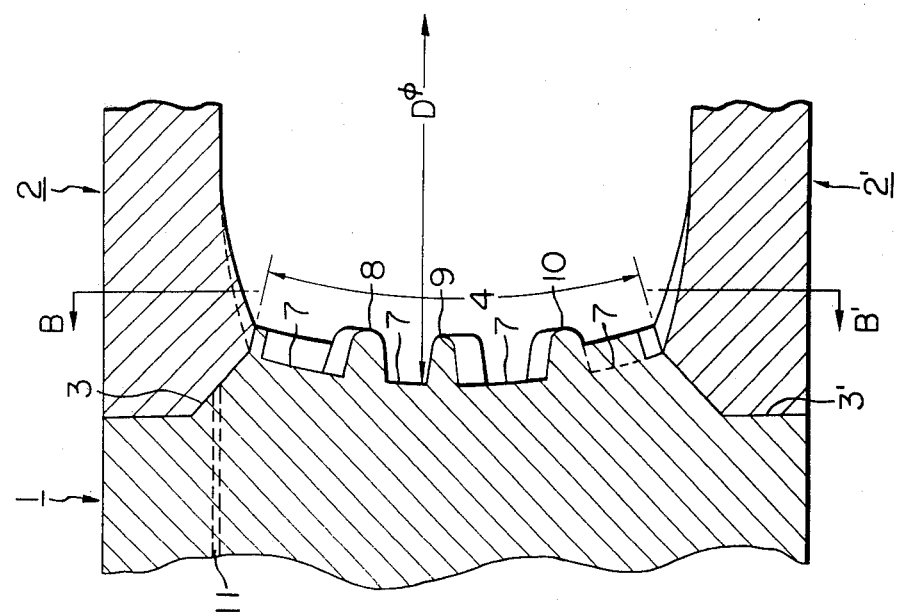

FIG. 4 is a partially enlarged crosssection of a tire molding mold of the split mold type shown in FIG. 1.

Figure 5:
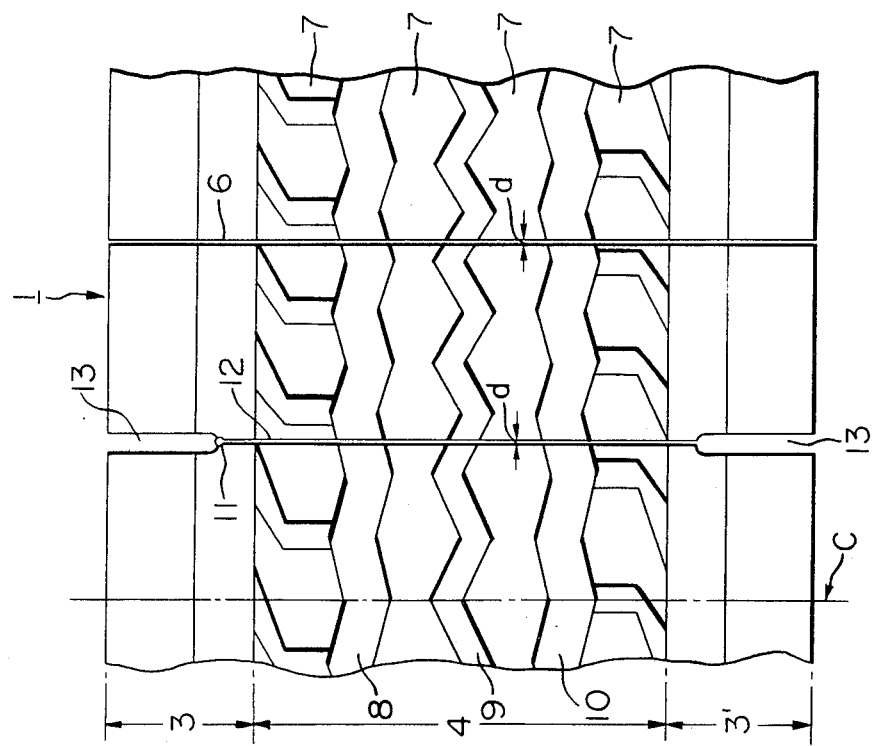
FIGS. 4 through 7 are diagrams of assistance in explaining a manufacturing method of a ring-shaped mold according to this invention.

FIG. 5 is a side development of the tread portion 1 viewed from the direction of arrows B—B' in FIG. 4 (FIG. 4 is a crosssection taken along line C shown in FIG. 5).

Figure 6:
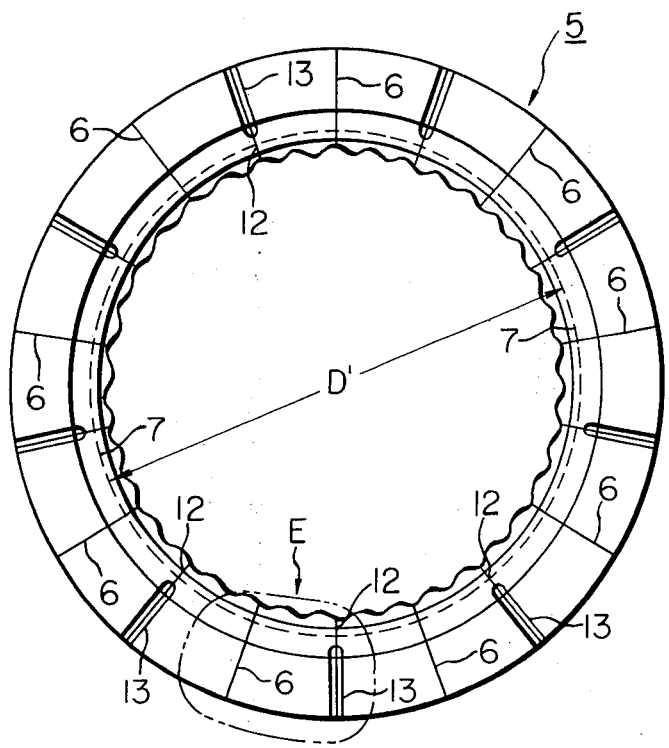

FIG. 6 is a plan view of a tread ring.

Figure 7:
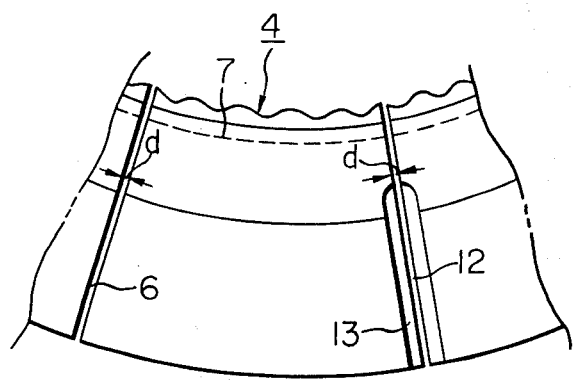

FIG. 7 is an enlarged view of the portion encircled by alternate long and two short dashes line E in FIG. 6. In the figure, reference numerals 1 through 6 and symbol d correspond to like numerals and symbol in FIG. 1. Numeral 7 refers to a contour surface; 8 through 10 to projections; 11 to a through hole; 12 and 13 to incisions; symbol D' to the inside diameter of the tread ring 5 (strictly speaking, D' represents the inside diameter of the contour surface 7, and hereinafter refereed to as ring inside diameter.)

In general, the tire molding mold of the split mold type is divided into the tread portion 1 and the shoulder portions 2 and 2', as shown in FIG. 4; the tread portion 1 and the shoulder portions 2 and 2' being fitted together closely at the faying surfaces 3 and 3'. Furthermore, the tread portion 1 having the tread surface 4 comprising the contour surface 4 the profile of which corresponds to that of the tread surface of the tire being molded, as shown in FIGS. 4 and 5, and the projections 8 through 10 is divided into a plurality of separate blocks 1', as shown in FIG. 2.

The manufacturing method of the tread portion, comprising a plurality of separate blocks, of the tire molding mold of this invention is shown in FIGS. 6 and 7. The manufacturing method according to this invention is to construct the tread portion 1 by assembling into an annular shape the separate blocks divided by centripetally cutting the tread ring 5 shown in FIG. 6, which is a ring-shaped workpiece having formed the desired tread surface 4 on the internal circumference thereof. In the example shown in FIG. 6, the tread ring 5 is divided into 9 separate blocks.

Assuming that the number of division is n, the cutting allowance of the incision 6 is d, and the desired ring inside diameter of the tread portion 1 is D, the tread ring 5 according to this invention is manufactured in advance so that the diameter D' thereof is given by the following expression.

$$D' = D + (nd/\pi) \tag{1}$$

When n pieces of separate blocks obtained by cutting the tread ring 5 of diameter D' as given by the above equation at n incisions 6 with cutting allowances d, as shown in FIG. 6, the diameter of the tread portion 1 obtained by assembling the separate blocks in an annular shape becomes D. (In FIGS. 4 through 7, the incisions 12 and 13 and the through hole 11 are shown, in addition to the incisions 6 above. They are shown with a view to explaining another embodiment of this invention, which will be described later.)

Figure 13A:
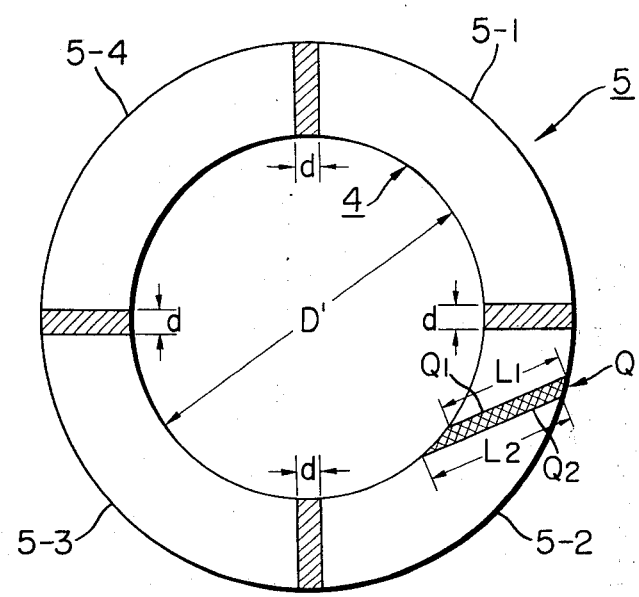
FIGS. 13A and 13B are diagrams of assistance in explaining the effects on a ring-shaped mold of cutting allowances and cutting direction when cutting a ring-shaped workpiece into separate blocks.
Figure 13B:
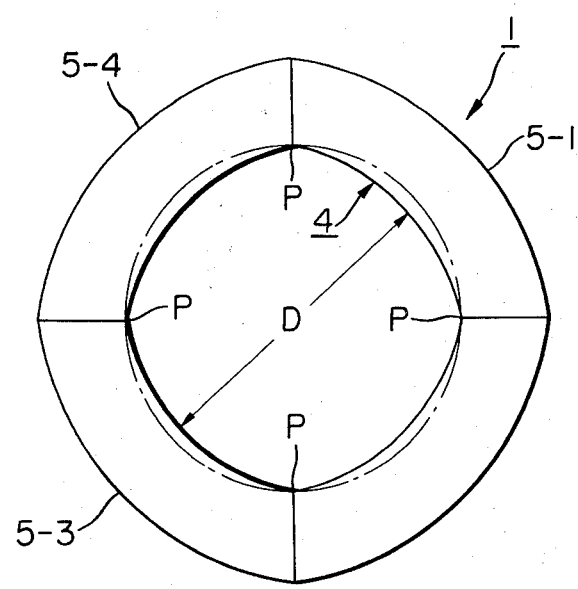

As described above, when a set of tread portion is manufactured from a single piece of tread ring, roundness of the tread portion assembled may be deteriorated depending on the size of cutting allowances during cutting. This problem will be described in detail, referring to FIGS. 13A and 13B. Now, assume that the tread portion 1 is constructed by assembling the separate blocks 5-1 through 5-4 obtained by dividing the tread ring 5 the annular inside circumferential diameter of which is D' into four with cutting allowances d. In this case, it is needless to say that the tread ring 5 is divided by cutting in the centripetal direction. The tread portion 1 formed by assembling the separate blocks 5-1 through 5-4 is shown in FIG. 13B. The figure is drawn in a somewhat exaggerated manner to facilitate the understanding of the roundness problem mentioned above. As is evident from FIG. 13B, the annular internal circumference, or the tread surface 4 of the tread portion 1 constructed of the separate blocks 5-1 through 5-4 is out of round. As is apparent from the concentric circle (as shown by alternate long and short dash line in the figure) passing through the contact points P of each separate block on the tread surface 4, the tread surface 4 deviates from the concentric circle at the contact points P. In the foregoing, the roundness problem of the tread surface when a set of tread portion is formed by dividing a single piece of tread ring has been described, taking the case of fourfold division as an example by reference to FIGS. 13A and 3B, but the same applies to the case of n-fold division, as a rule. The tests conducted by the present inventor, however, reveals that cutting the tread ring 5 by means of a cutting machine using a wire cutting tool, for example, a wire electrode electro-discharge machining equipment, permits the cutting allowances d at the incisions 6 to be reduced to less than 0.3 mm, and that the tires molded with the tire molding mold constructed of the tread portions manufactured by cutting the tread ring by means of the wire electrode electro-discharge machining equipment are within the error range of approximately 0.03 mm with respect to roundness, causing no practical problem. Based on these test results, the tire molding mold according to this invention is manufactured by cutting the tread ring 5 at the incisions 6 by means of a cutting machine using a wire cutting tool (for example, a wire electrode electro-discharge machining equipment), as shown in FIG. 6. (An example of the cutting machine mentioned above will be described later.)

When a tread ring 5 subjected to internal stresses is cut off at any one incision 6 as shown in FIG. 6, the shape of the cut-off tread ring 5 may be distorted or expanded due to the applied stresses, making it difficult to position the remaining incisions. Now, another example of the manufacturing method of the tire molding mold according to this invention which prevent this unwanted phenomenon will be described. If FIGS. 4 and 5, through holes 11 (refer to FIG. 4) reaching the outer circumference of the tread ring 5 are provided at each cutting position on any one of the faying surface 3 or 3' (the faying surface 3 in the example shown in FIGS. 4 and 5). After a wire cutting tool of the cutting machine, for example, a wire electrode of a wire electrode electro-discharge machining equipment, is passed through the through hole 11, slitting is performed from the through hole 11 across the tread surface 4 as far as at least the faying surface 3' on the other side. With this slitting, a plurality of slits 12 traversing the tread surface 4 are formed. During this slitting operation, however, the tread ring 5 is left unseparated at the portions other than the slits 12, causing neither distortion of the tread ring due to internal stressed nor mispositioning of incisions. Thus, the tread portion divided into the desired number of separate blocks can be formed by cutting the tread ring 5 from the outer circumference thereof to both ends of the slits 13 in FIG. 7 by means of an appropriate cutting means for example, a band saw. (The portions cut by the above cutting operation are shown by cutting portions 13 in FIGS. 5 through 7). The cutting portions 13, even with large cutting allowances provided, do not affect the tread surface 4. Although the above description is based on the assumption that the through holes 11 are provided on the faying surface 3 or 3', a wire electrode may be passed through gas vent holes (not shown), which are often provided in advance on the tread surface 4 for the purpose of tire molding operation, to produce slits traversing the tread surface 4 and reaching the faying surfaces 3 and 3'. In such a case, it is not necessary to specially provide the through holes 11 above.

As described above, in manufacturing a plurality of divided tread portions for a tire molding mold of the split mold type, this invention makes it possible to manufacture a set of tread portions from a single piece of tread ring by cutting the tread ring by means of a cutting machine using a wire as the cutting tool thereof, and to provide a tire molding mold of the split mold type at lower manufacturing costs with simplified manufacturing processes because the need for increasing the positioning accuracy of cutting positions during cutting. In the foregoing, description has been made on a tire molding mold as an example, but it is needless to say that this invention can be applied to other ring-shaped mold of the split mold type.

Next, an example of a cutting device used for manufacturing a ring-shaped mold of the split mold type according to this invention will be described. Prior to the specific description, a fundamental function to be furnished in the cutting device of this invention will be outlined. The fundamental function is to cut the tread ring substantially in the centripetal direction (or in the normal line direction). For example, when the cutting is performed in other directions than the normal line direction, as shown by arrow Q in FIG. 13A, the faying surfaces $Q_1$ and $Q_2$ (shown in FIG. 13A) of the separate blocks formed by the cutting may have different lengths $L_1$ and $L_2$. The difference in the lengths $L_1$ and $L_2$ may pose an obstacle in forming the tread portion by assembling a plurality of separate blocks thus formed into an annular shape. It is for this reason that the cutting device used in this invention must have a function of cutting the tread ring substantially in the normal line direction. It however is approved to get out of the normal line direction unless the difference of the length $L_1$ and $L_2$ does not appear extremely.

Figure 9:
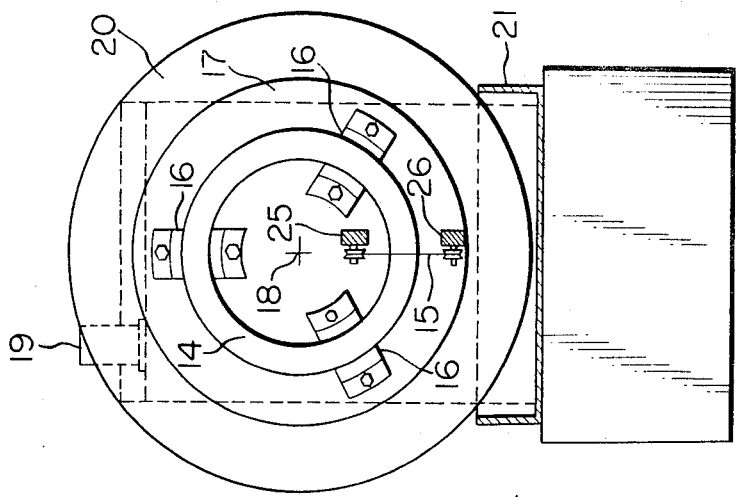
FIG. 9 is a side view thereof viewed from the direction of arrows F—F' shown in FIG. 8.
Figure 8:
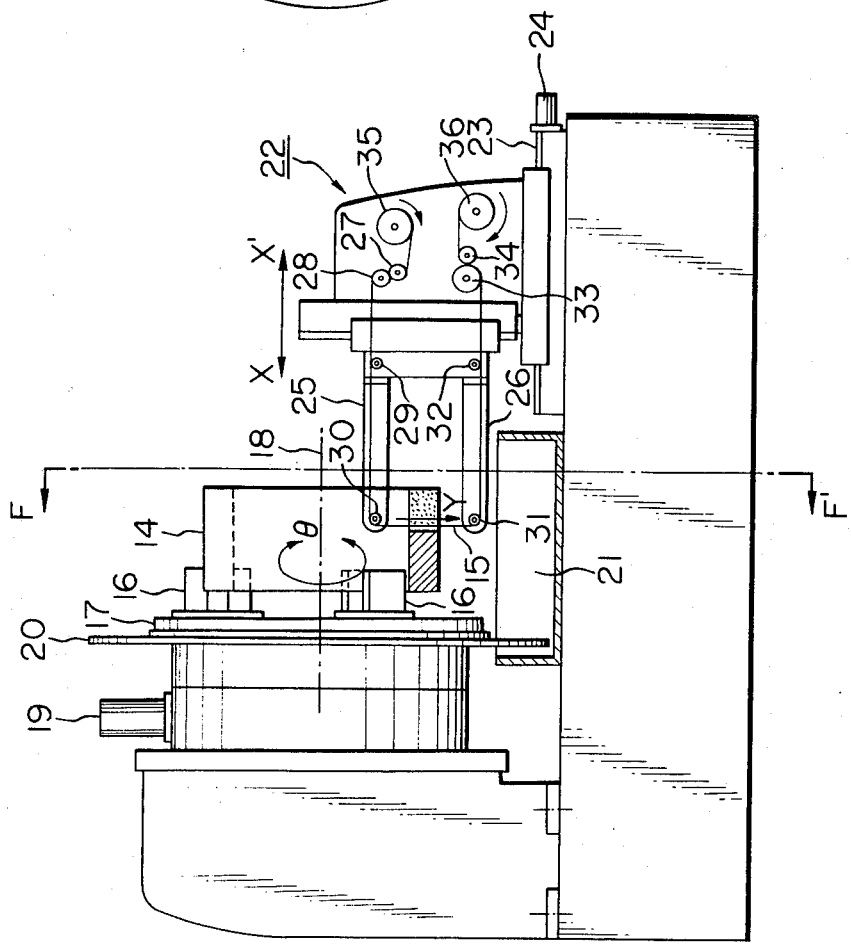
FIG. 8 is a front view of a cutting device used in this invention.

FIGS. 8 and 9 are diagrams illustrating an example of a wire electrode electro-discharge machining equipment used in this invention; FIG. 8 being the front view thereof and FIG. 9 being the side elevation thereof taken along line F—F' in FIG. 8. Reference numeral 14 refers to a ring-shaped workpiece, corresponding to the tread ring 5 shown in FIG. 6; 15 to a wire electrode; 16 to a fastening jig for supporting the ring-shaped workpiece 14; 17 to a rotating table rotating in the direction shown by arrow $\theta$ in the figure; 18 to the rotating center line of the table 17; 19 to a pulse motor for driving and controlling the rotating table 17 to cut the ring-shaped workpiece 14 with the wire electrode 15; 20 to a working fluid splash cover for preventing working fluid (not shown) to be fed to the machining portion from being splashed; 21 to a working fluid tank; 22 to a working head; 23 to a sliding table; 24 to a pulse motor for driving and controlling the working head 22 on the sliding table 23 in the direction shown by arrows X and X' in the figure to cut the ring-shaped workpiece 14 with the wire electrode 15; 25 and 26 to wire electrode supporting arms liftably supported by the working head 22 for supporting the wire electrode 15; 27 through 34 to guide reels; 35 to a wire bobin; 36 to a take-up bobin rotating in the direction shown by arrow in the figure for taking up the wire electrode 15 which is fed from the wire bobin 35 and guided by the guide reels 27 through 34, respectively. In the cutting device of this invention shown in FIGS. 8 and 9, the ring-shaped workpiece 14 is supported by the fastening jig 16 so that the annular center of the ring-shaped workpiece 14 coincides with the rotating center line 18 of the rotating table 17. The wire electrode 15 is disposed so that an extension of the wire electrode 15 travelling between the guide reels 30 and 31 (in the direction shown by arrow Y in the figure) intersects the rotating center line 18 of the rotating table 17 at all times. Furthermore, a d-c voltage corresponding to the desired machining conditions is applied to the wire electrode from a power supply (not shown), and working fluid is fed to a discharge gap between the wire electrode 15 and the ring-shaped workpiece 14. The cutting of the incisions 6 and 12 shown in FIGS. 5 through 7 is effected by causing the wire electrode 15 to travel in the direction shown by arrow Y in the figure while feeding the working head 22 by the pulse motor 24 in the direction shown by arrow X in the figure. Furthermore, in the cutting device of this invention, the rotating table 17 supporting the ring-shaped workpiece 14 by means of the fastening jig 16 is constructed so as to be driven and controlled in the direction shown by arrow $\theta$ in the figure by the pulse motor 19. Consequently, not only cutting in the direction vertical to the center line CL (as shown in FIG. 1), as in the case of the incision 6 or 12 in FIG. 5, but also cutting in the direction oblique to the center line CL can be effected by appropriately selecting the ratio of the rotation control speed of the ring-shaped workpiece 14 by the pulse motor 19 to the feed control speed of the working head 22 by the pulse motor 24.

Although a wire cut electro-discharge machining equipment is shown in FIGS. 8 and 9 as an example of the cutting device according to this invention, a mechanical cutting device using a mechanical wire cutting tool may be used, instead of the wire electrode 15, for cutting the ring-shaped workpiece 14. Such a mechanical cutting device, however, of course requires a controlling and driving mechanism of the ring-shaped workpiece and the wire cutting tool similar to that described in FIGS. 8 and 9.

In the foregoing, a manufacturing method of a ring-shaped mold of the split mold type embodying this invention and a cutting device used for this purpose have been described.

Next, another embodiment of this invention and the method of making the same will be described.

In assembling a plurality of separate blocks 1' into an annular shape to form a ring-shaped mold of the split mold type, for example, a tire molding mold, as shown in FIG. 2, it is not easy to assemble them in perfect roundness. If the separate blocks 1' are not assembled in perfect roundness, the tread surface 4 becomes discontinuous due to level difference at the sector lines SL(corresponding to the incisions 6 and 12 shown in FIGS. 5 through 7). If the sector lines SL on the tread surface 4 lie at right angles with the center line CL, as in the conventional tire molding mold of the split mold type, discontinuities on the tread surface 4 are concentrated at angular positions where the sector lines SL exist. Consequently, tires molded with such a mold have discontinuities concentrated at angular positions corresponding to the sector lines SL. As a consequence, an automobile equipped with such tires tends to cause vibration in the body thereof during travelling. It is generally recognized that vibration caused by the rotation of tires becomes severest when the tires and the automobile body are in 8th resonance mode. Therefore, tires molded with a mold consisting of 8-portion separate blocks tend to facilitate the 8th resonance mode, increasing vibration. To overcome this problem, it has heretofore been considered to divide a tire molding mold into 9 separate blocks, as shown in FIG. 2. In any case, tires molded with the conventional tire molding mold where the sector lines SL on the tread surface 4 lie at right angles with the center line CL are very apt to facilitate vibration.

Another embodiment of this invention intended to overcome this problem and prevent vibration from being generated will be described, referring to FIGS. 10A and 10B.

FIG. 10A is an enlarged view of the cross-section shown in FIG. 1. FIG. 10B is a developed side elevation taken along line G—G' in FIG. 10A. Reference numerals 1 through 5, and 7 through 10 in the figures correspond to like numerals in FIG. 4. Numerals 37 and 37' refer to projections at the shoulder portions 2 and 2'.

In FIG. 10B, the sector line SL represents the faying portion of the separate blocks on the tread portion of the tire molding mold manufactured with the already described method (as shown in FIGS. 4 through 7), while the sector lines $SL_1$ and $SL_2$ refer to other examples of the faying portion.

As shown in FIG. 10B, the sector lines $SL_1$ and $SL_2$ traverse the tread surface 4 obliquely with respect to the direction of the rotation of the tire, or the center line CL. Whereas the sector line SL lies at a given angular position in the direction of the center line CL, the sector line $SL_1$ or $SL_2$ lies in a circumferential range ($W_1$ or $W_2$ in FIG. 10B) of the tread portion 1 in the direction of the center line CL. This permits discontinuities on the tread surface 4 to be distributed over a wider range along the outer circumference of the tread portion 1. Thus, in an automobile, for example, using tires molded with a tire molding mold having the sector line $SL_1$ or $SL_2$, vibration caused during the rotation of the tires due to discontinuities on the tire tread surface resulting from the existence of the sector lines can be distributed over the outer circumference of the tire. Furthermore, the need for setting the number of division of separate blocks to nine portions, for example, can be eliminated.

Figure 11:
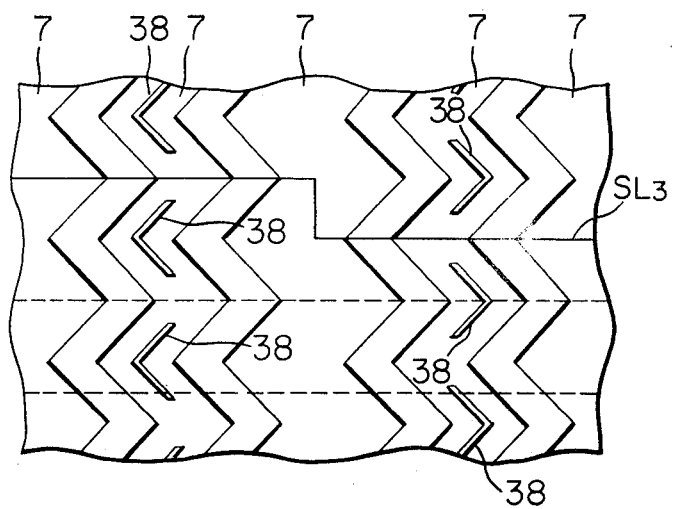
Figure 12A:
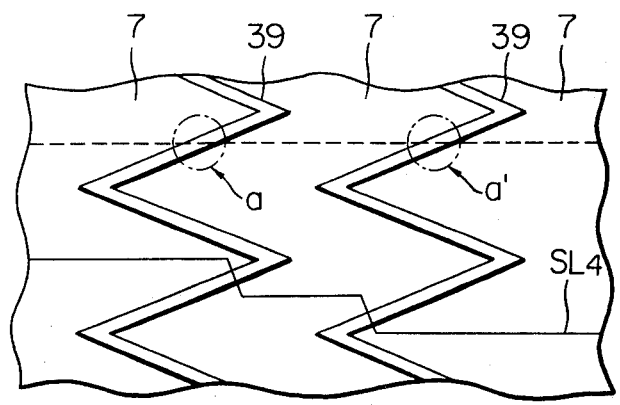
Figure 12B:
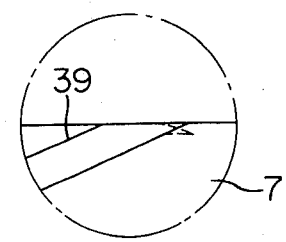

Next, another embodiment of the ring-shaped mold of the split mold type of this invention will be described, referring to FIGS. 11, 12A and 12B. In a ring-shaped mold of the split mold type, such as a tire molding mold, thin blades 38 are provided by planting into grooves formed on the tread surface 4, as shown in FIG. 11, to form thin grooves on the tire pattern to be molded. When the blades 38 are cut apart, as shown by dotted lines in the figure, in dividing the tread ring, negligibly small portions of the blades 38 left on any separate blocks have to be removed and the planting grooves thereof have to be filled by argon welding, for example. Even in the case of large portions of the blades 38 left on any separate blocks, it is necessary to retain them in position with pins or other appropriate means to prevent loosening or movement. Such troublesome post-treatments can be eliminated by dividing the tread ring at a sector line $SL_3$ (shown by a solid line in FIG. 11) to clear the blades 38.

Where long and continuous projections 39 are provided, as shown in FIG. 12A, it often happens that the projections 39 have to be cut apart in dividing the tread ring. Particularly, with an aluminum mold where the projections 39 are cut apart at a sector line (shown by a dotted line in the figure), the tips of the projections 39 tend to wear out or bend during repeated vulcanizing operations, as shown by a dotted line in FIG. 12B illustrating an enlarged view of the portion a or a' in FIG. 12A. This necessitates troublesome maintenance to correct the wear or bend of the projections 39, or the use of a stronger material, such as iron, as the projections 39, increasing the maintenance and manufacturing costs of molds.

This problem can be solved by cutting the tread ring at right angles with the projections 39, for example, at a sector line $SL_4$ shown by a solid line in FIG. 12A.

As described above, a ring-shaped mold of the split mold type according to this invention, that is, a ring-shaped mold having sector lines SL, $SL_1$, $SL_2$ (embodiments shown in FIG. 10B), $SL_3$ (an embodiment shown in FIG. 11) and $SL_4$ (an embodiment shown in FIG. 12A) can be easily manufactured by using the cutting machine shown in FIGS. 8 and 9.

What is claimed is:

1. A method of constructing a ring-shaped mold for tire manufacturing and which includes radially outer portions having an inside diameter defining a tire track configuration comprising:

forming a workpiece ring having the inside diameter with the tire track configuration;

cutting the workpiece ring along a plurality of angularly spaced radial lines to form it into a plurality of blocks using a wire cutting tool which cuts a minimum of the material away from the workpiece;

and thereafter assembling the blocks into an annular shape to form a ring-shaped mold;

the workpiece ring including opposite faying surfaces;

said method including cutting the workpiece ring from opposite outside faces thereof only into the faying surfaces using a saw which cuts to an increased width with repsect to the wire cutting tool.

2. A method according to claim 1, including providing at least one opening through the workpiece ring at at least one of the faying surfaces thereof and in a transition area between a saw cut and a wire tool cut for providing access for the wire tool to make the wire tool cut.

3. A method according to claim 1, including supporting the workpiece ring for rotation about a central axis thereof, carrying the wire cutting tool for sliding movement parallel to the central axis of the workpiece ring and moving the wire cutting tool parallel to the central axis.

4. A method according to claim 3, including rotating the workpiece ring as the wire cutting tool is moved to form cuts between the blocks which have opposite radial ends which are offset circumferentially with each other.

5. A method according to claim 4, wherein the tire track configuration includes a plurality of discrete projections, said method including rotating the workpiece ring as the wire cutting tool moves to avoid cutting any of said projections.

6. A method according to claim 4, wherein the tire track configuration includes a plurality of projections extending at an angle to said central axis, said method including rotating said workpiece ring as the wire cutting tool moves to cut said projections substantially normally to a longitudinal extent of said projections.

7. A method of manufacturing a ring-shaped mold comprising:

moving a wire of a wire cutting tool between a pair of guide reels;

moving a ring-shaped workpiece with respect to the wire of the wire-cutting tool in a plane containing a central axis of the ring-shaped workpiece, for cutting the ring-shaped workpiece;

intersecting the ring-shaped workpiece with the wire of the wire cutting tool at a plurality of circumferentially spaced locations on the ring-shaped workpiece and across a width of the ring-shaped workpiece to cut the ring-shaped workpiece into a plurality of section separate blocks;

n sectional separate blocks being formed by cutting the ring-shaped workpiece at n positions, the cutting width of each cut having a diameter d, the ring-shaped mold having an inside diameter D and being formed by cutting the ring-shaped workpiece which has an inside diameter D', wherein D' substantially equals $D + nd/\pi$; and assembling the plurality of sectional separate blocks into an annular shape to form the ring-shaped mold having the inside diameter D.

8. A method of manufacturing a ring-shaped mold according to claim 7, wherein the ring-shaped workpiece has an inner annular circumference which carries a tread surface of a profile corresponding to the tread pattern of a tire to be molded, said separate block being formed by cutting the ring-shaped workpiece in such a direction as to intersect the inner annular circumference of the ring-shaped workpiece.

9. A method of manufacturing a ring-shaped mold according to claim 8, wherein the tread surface of the ring-shaped workpiece includes a plurality of projections, said method including cutting the ring-shaped workpiece along at least a part of said projections.

10. A method according to claim 8, wherein said tread surface of the ring-shaped workpiece includes a plurality of discontinuous projections, said method including cutting said ring-shaped workpiece between at least some of said projections so as not to intersect said projections with a cut.

11. A method according to claim 8, wherein said tread surface of the ring-shaped workpiece includes a plurality of elongated projections, aid method including cutting the ring-shaped workpiece in a manner to traverse at least some of said projections substantially at right angles to their direction of elongation.

12. A method according to claim 8, including, before moving the ring-shaped workpiece and wire cutting tool with respect to each other, forming a plurality of through holes extending through the ring-shaped workpiece, but not into the tread surface and passing a wire of the wire-cutting tool into each opening, the wire-cutting tool and ring-shaped workpiece being moved with respect to each other thereafter for cutting the ring-shaped workpiece into the blocks.

13. A method according to claim 8, wherein the wire cutting tool includes a wire, said method including moving the wire as the ring-shaped workpiece is cut in a centripetal direction substantially normal to a central axis of the ring-shaped workpiece.

14. A method according to claim 13, including rotating the ring-shaped workpiece about its center axis as the ring-shaped workpiece is moved with respect to the wire-cutting tool.

15. A method according to claim 14, wherein the ring-shaped workpiece is rotated by an apparatus having a rotating table for supporting the ring-shaped workpiece around its center axis, a rotation control portion for driving and controlling the rotating table, the wirecutting tool being mounted for movement in a direction parallel to the center axis with the wire being mounted for movement normal to the center axis.

16. A method according to claim 7, including supporting the workpiece ring for rotation about a central axis thereof, carrying the wire cutting tool for sliding movement parallel to the central axis of the workpiece ring and moving the wire cutting tool parallel to the central axis.

17. A method according to claim 16, including rotating the workpiece ring as the wire cutting tool is moved to form cuts between the block which have opposite radial ends which are offset circumferentially with each other.

18. A method according to claim 17, wherein the tire track configuration includes a plurality of discrete projections, said method including rotating the workpiece ring as the wire cutting tool moves to avoid cutting any of said projections.

19. A method according to claim 17, wherein the tire track configuration includes a plurality of projections extending at an angle to said central axis, said method including rotating said workpiece ring as the wire cutting tool moves to cut said projections substantially mormally to a longitudinal extent of said projections.

* * * * *